Patented Jan. 13, 1931

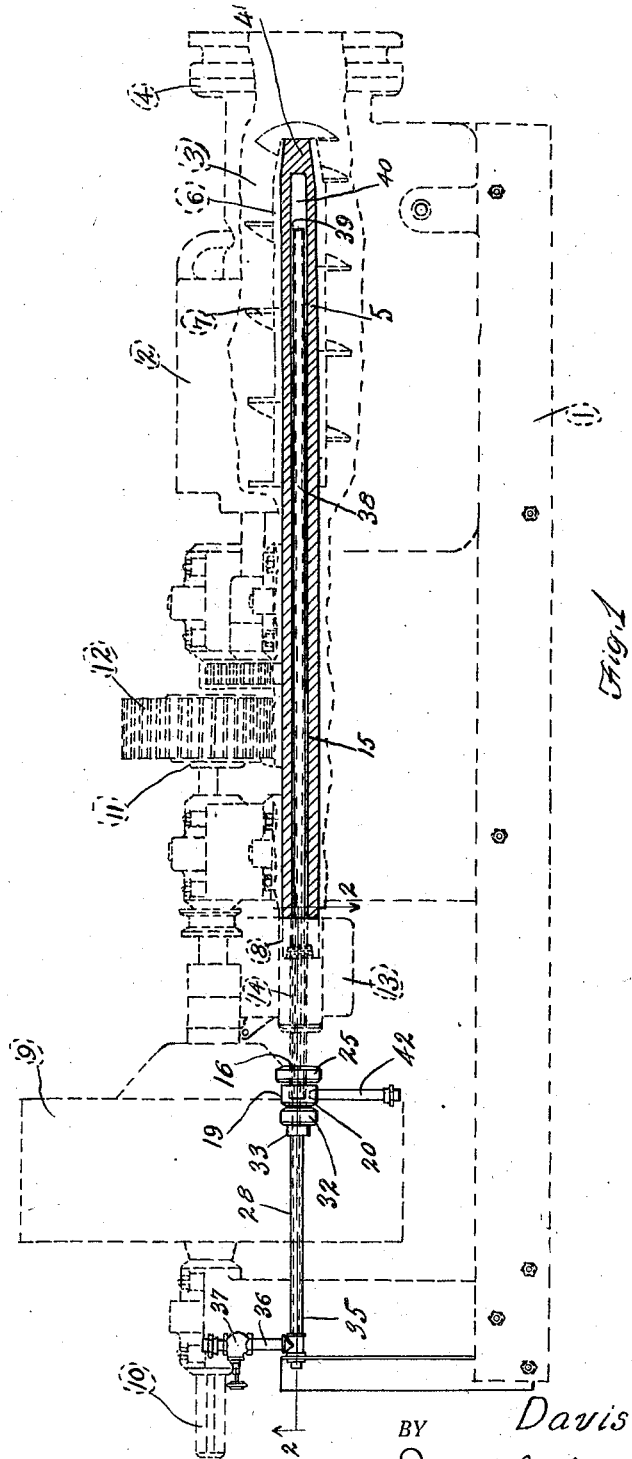

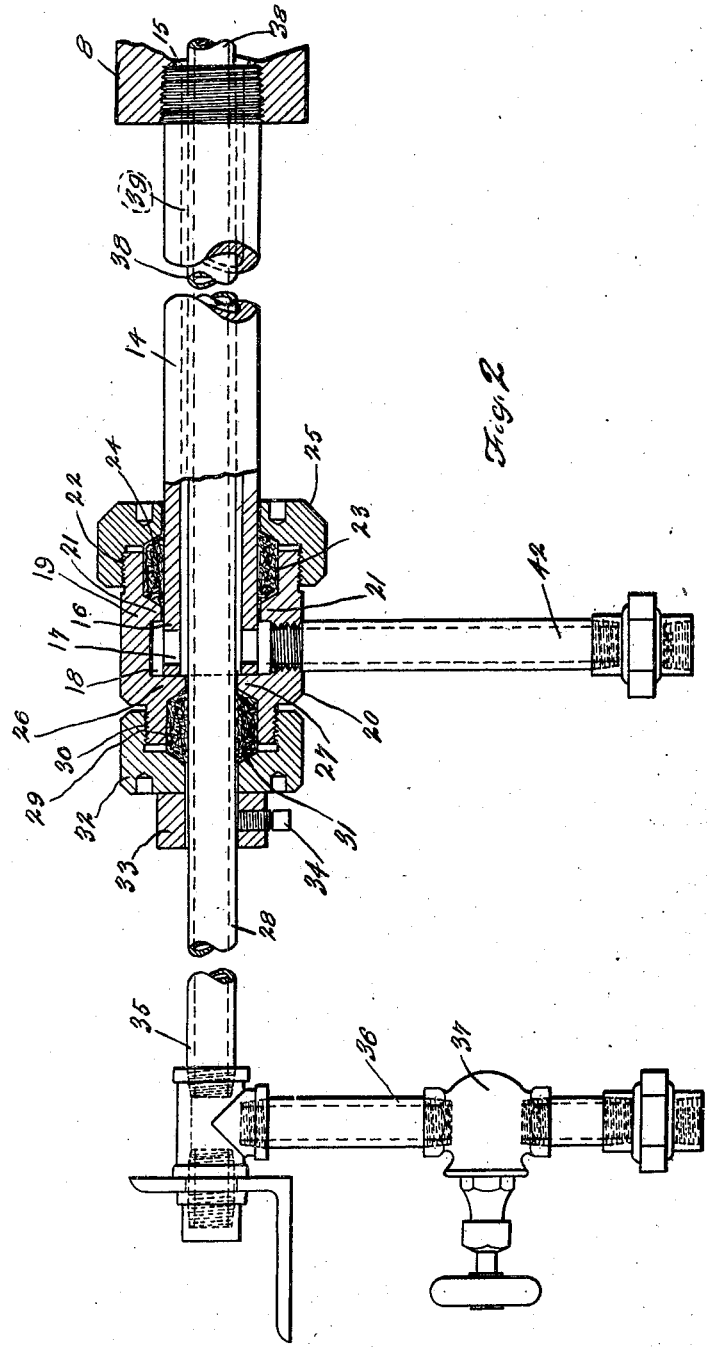

1,788,821

UNITED STATES PATENT OFFICE

DAVIS BROWN, OF BUCYRUS, OHIO, ASSIGNOR TO W. A. RIDDELL COMPANY, OF BUCYRUS, OHIO, A CORPORATION OF OHIO

HEATED SCREW-EXTRUSION MACHINE

Application filed June 7, 1928. Serial No. 283,653.

The present invention, relating, as indicated, to extruding machines, has more particular reference to machines of the type employing an auger or screw for moving material from a hopper through a forming die, and its principal object is the provision of a heating system whereby the material of a heating system whereby the material adjacent to said auger can be heated to prevent its solidifying and insure a continuous and uniform expulsion thereof through the die.

In the operation of machines of this class, and especially when working with materials containing asphalt, tar or the like, it is essential that the material within the hopper and within the casing enclosing the extruding-screw shall be maintained at an elevated temperature to prevent freezing or solidification thereof. Moreover, it is preferable that the heat used for this purpose be applied near the center of the mass because if the material near the screw casing and in the hopper has a higher temperature than the part of the mass near the screw, such material will form a film or layer of lesser viscosity and so "lubricate" the main mass and permit it to revolve in the casing without being forced axially through the die. On the other hand, if the center of the mass of material within the extruding-screw casing be heated to a relatively higher temperature than the outer layers, proper expulsion through the die will follow as a matter of course.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:—

Fig. 1 is a partly sectional and partly broken away side elevational view showing an extruding machine embodying my improvements; and Fig. 2 is a vertical section taken on a plane indicated by the line 2—2 of Fig. 1.

In the drawings, my invention is shown in association with an extruding machine comprising a base 1 which, near its forward end, carries a hopper 2 that communicates with a screw casing 3 having a die 4 removably secured to its outer end. Within the casing 3 and mounted upon a closed-ended hollow shaft 5 is a sleeve 6 which is formed with a helical blade or screw 7, this screw, when rotated, being adapted to move material from the hopper 2, longitudinally of the casing 3 and finally through the die 4. The shaft 5 may have a part 8 extending rearwardly through the casing 3 and may be journaled in any suitable manner. For revolving the screw 7, any approved mechanism may be employed, that shown in Fig. 1 consisting of a pulley 9 mounted upon a drive shaft 10 which carries a pinion 11 arranged to intermesh with another gear 12 secured to the rearwardly extending part 8 of the shaft 5.

The end of the rearwardly extending part 8 of the shaft 5 may adjustably coact with a thrust bearing enclosed within the lubricant reservoir 13 and may have a tube 14 screwed into its bore 15, the latter projecting through the reservoir 13 and, at or near its end 16, having a plurality of perforations or holes 17 whereby the interior of such tube and consequently the interior or bore of the shaft 5 is placed in communication with a receiver or chamber 18 formed in the body 19 of a swivel connection, coupling or joint 20. The body 19 of the swivel connection 20 may have bearings 21 for revolubly supporting the end 16 of the tube 14 and at its forward end is threaded as at 22 and provided with a recess 23 for receiving a quantity of packing 24, such packing being forced into intimate contact with the tube 14 by a nut 25 engaging with the threads 22. The rearward end 16 of the tube 14 may seat against the boss 26, such boss being formed in the body 19 and having an inwardly extending flange or shoulder 27 in close proximity to the outside of a stationary non-revoluble pipe 28, the shoulder 27 being continued around a recess 29 and terminating in a threaded end 30.

The recess 29 is adapted for receiving a quantity of packing 31, such packing being forced into sealing relation with the pipe 28 by a nut 32 engaging with the threads 30 and additionally secured in place by a collar 33 carrying a set screw or the like 34.

The projecting end 35 of the pipe 28 is connected to an inlet pipe 36 controlled by a valve 37 and its forward end 38 is arranged in spaced concentric and telescoped relation to the bore 15 of the shaft 5 and the similar bore of the tube 14, thereby forming an annular passageway 39 which, at one end, opens into a chamber 40 behind the extreme closed end 41 of the shaft 5 and, at its opposite end, communicates through the perforations 17 and the receiver 18 with an outlet pipe 42, thus forming a complete circuit through which steam or other temperature modifying medium can be conveyed for heating or otherwise controlling the temperature of the contents of the hopper 2 and the casing 3 from the center outwardly, the heat being transferred from the shaft 5, through the sleeve 6 and its blade 7 to the interior of the mass to thereby control the temperature of such mass in the preferable manner heretofore explained, and adapt the machine to working with materials that freeze or solidify at atmospheric or room temperatures.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In combination with an extrusion machine comprising a hopper, a die and an auger for moving material from said hopper through said die; a hollow shaft for supporting said auger, a pipe within said shaft, and means for revolubly supporting said shaft and stationarily supporting said pipe.

2. In combination with an extrusion machine comprising a hopper, a die and an auger for moving material from said hopper through said die; a hollow shaft for carrying said auger, a pipe within said shaft and a coupling between said shaft and said pipe, said coupling stationarily supporting said pipe, revolubly supporting said shaft, and having an outlet connection with said shaft.

3. In combination with an extrusion machine comprising a hopper, a die and an auger for moving material from said hopper through said die; a revoluble shaft for supporting said auger, and means for heating said shaft, said means comprising a stationary steam-conveying pipe positioned within said shaft.

4. In combination with an extrusion machine comprising a hopper, a die and an auger for moving material from said hopper through said die; a revoluble shaft for supporting said auger, and means for heating said shaft, said means comprising a stationary steam-conveying pipe positioned within said shaft and about which said shaft revolves and forms therewith an annular passageway.

5. An extrusion machine comprising an auger, a casing for said auger, a closed-ended hollow shaft for revolving said auger, and a stationary pipe within said shaft, said pipe having a concentric relation to said shaft and forming therewith an annular passageway.

6. An extrusion machine comprising a casing, means for axially expelling material from said casing and means for carrying said expelling means, said carrying means having a closed forward end and an open rear end adapted to receive a stationary conductor for a temperature modifying medium.

7. An extrusion machine comprising a casing, means for expelling material from said casing, hollow means for revolving said expelling means, and stationary means within said hollow means for introducing a temperature-modifying medium, said last-named means having a concentric relation to said hollow means and forming therewith an annular exit passageway.

8. An extrusion means comprising a casing, a closed-ended hollow expelling means, and means associated with said expelling means for conducting a temperature-modifying medium into the hollow of said expelling means, said conducting means entering the open end of said expelling means and forming therewith a return passageway for said temperature modifying medium.

9. An extrusion machine comprising a casing, a closed-ended hollow expelling means, a tubular member entering said expelling means through its open end and a coupling between the open end of said expelling means and said tubular member, said coupling being adapted to stationarily support said tubular member and revolubly support said expelling means.

10. An extrusion machine comprising a casing, a hollow expelling means having a closed forward end and an open rear end and an inlet pipe extending into said hollow to a point near said closed end, said inlet pipe forming with said hollow an outlet passageway.

11. An extrusion machine comprising a casing, an auger for expelling material from said casing, a thrust bearing for said auger, and connections to the rear of said thrust bearing for introducing and withdrawing a temperature-modifying medium to and from said auger.

Signed by me this 4th day of June, 1928.

DAVIS BROWN.